Jan. 27, 1970  T. R. ASHTON ET AL  3,491,503
METHODS AND APPARATUS FOR FILLING PRESTERILIZED CONTAINERS
Filed June 14, 1967  13 Sheets-Sheet 1

INVENTORS

THOMAS RICHARD ASHTON
VICTOR CLAUDE HERBERT COTTLE
DAVID JACKSON
MICHAEL JOHN SMITH
WILLIAM DAVIDSON WEATHERUP

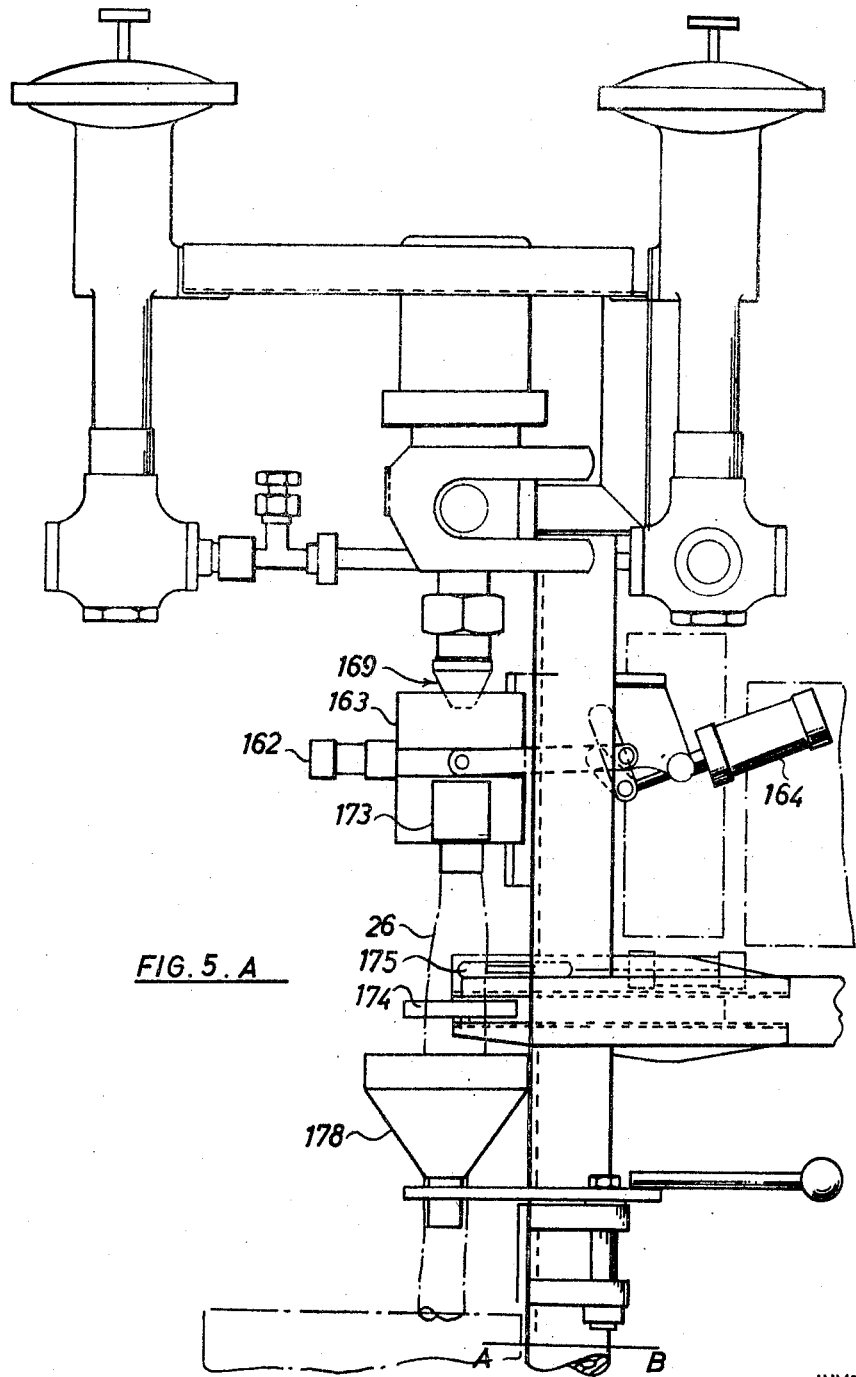
FIG. 5.A

Jan. 27, 1970     T. R. ASHTON ET AL     3,491,503
METHODS AND APPARATUS FOR FILLING PRESTERILIZED CONTAINERS
Filed June 14, 1967     13 Sheets-Sheet 5
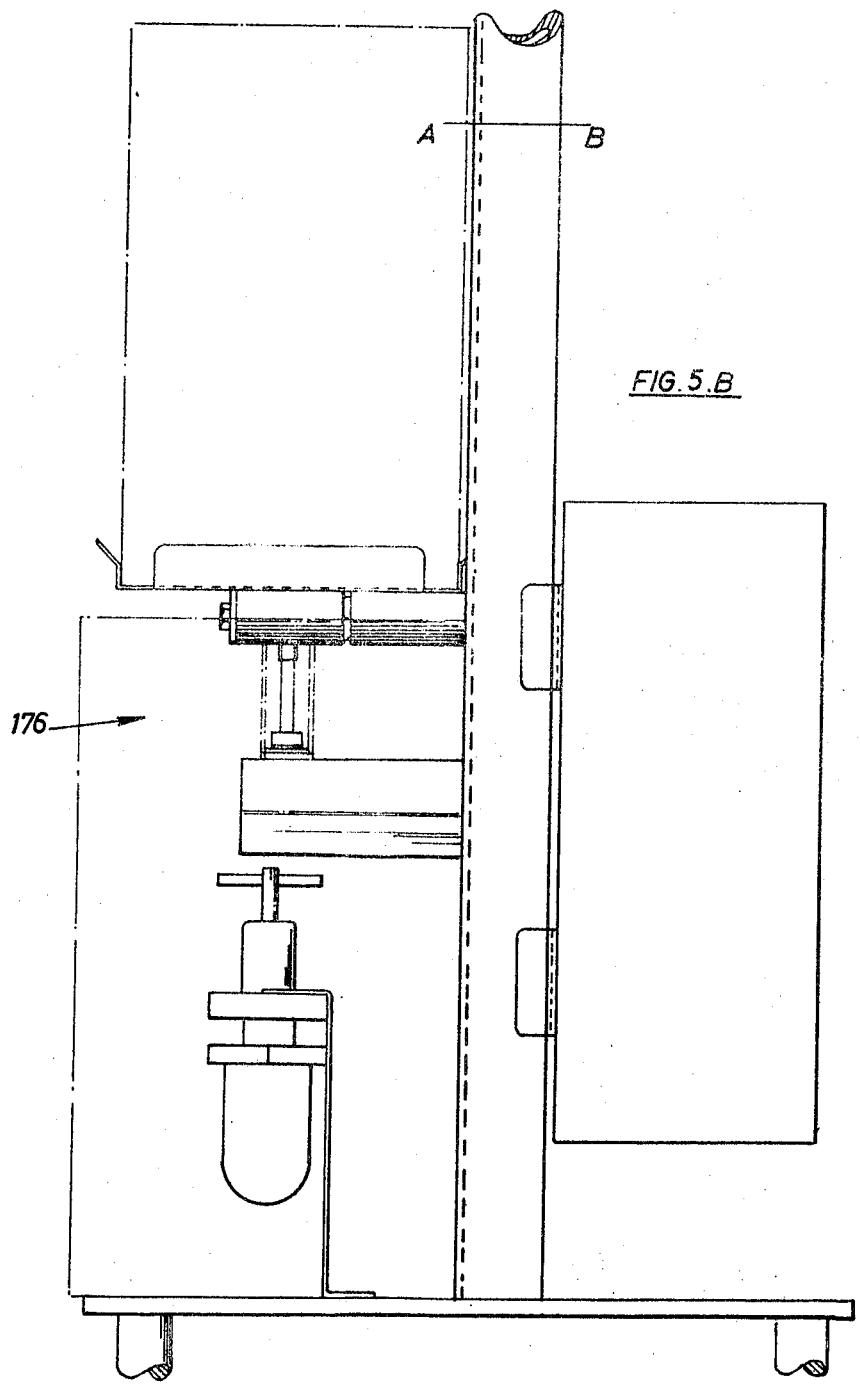
FIG.5.B
INVENTORS
THOMAS RICHARD ASHTON
VICTOR CLAUDE HERBERT COTTLE
DAVID JACKSON
MICHAEL JOHN SMITH
WILLIAM DAVIDSON WEATHERUP

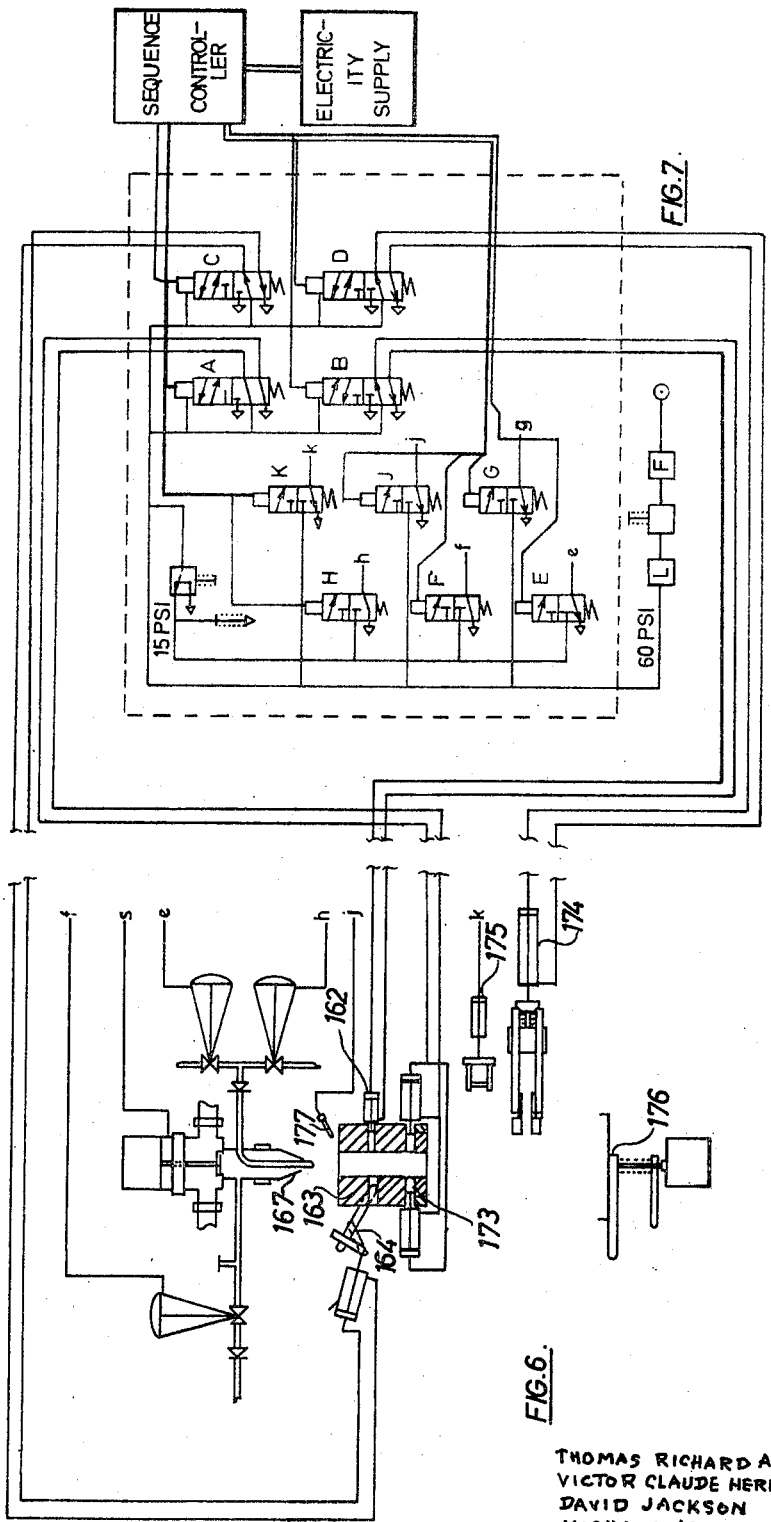

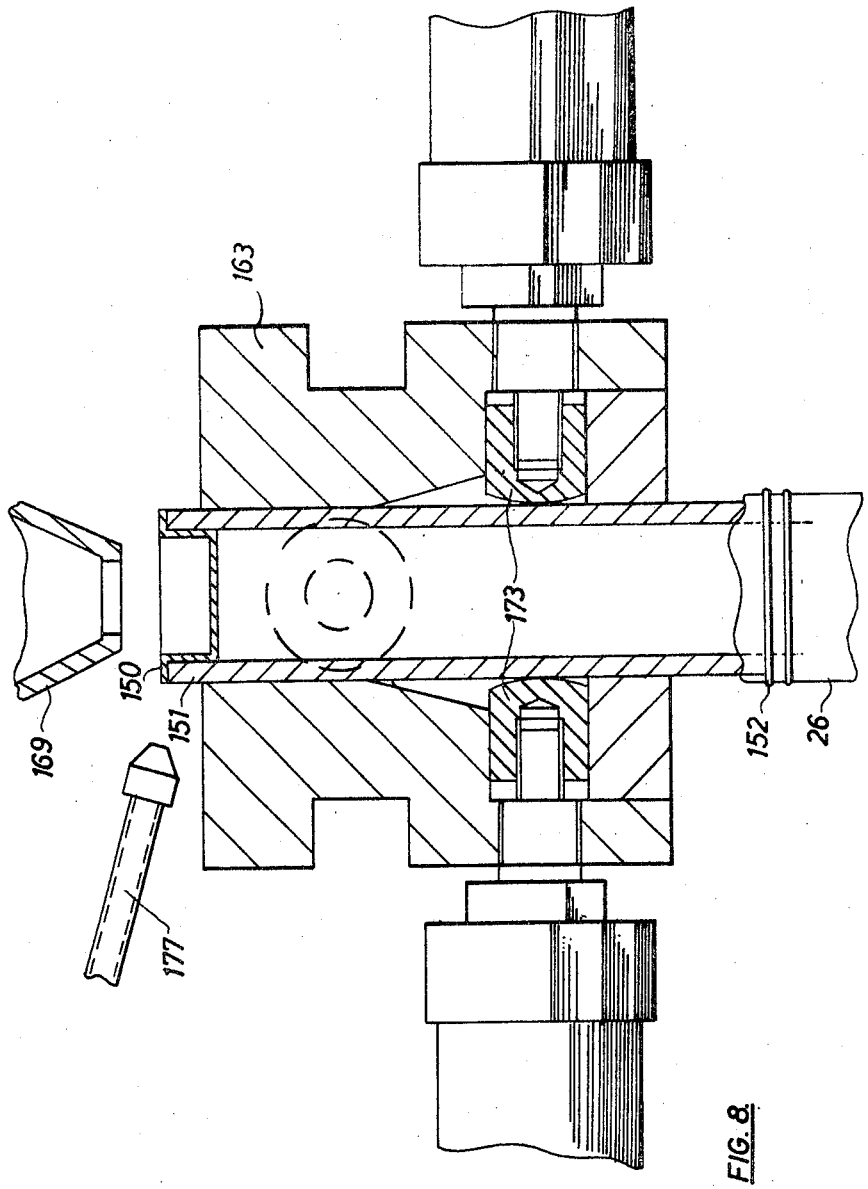

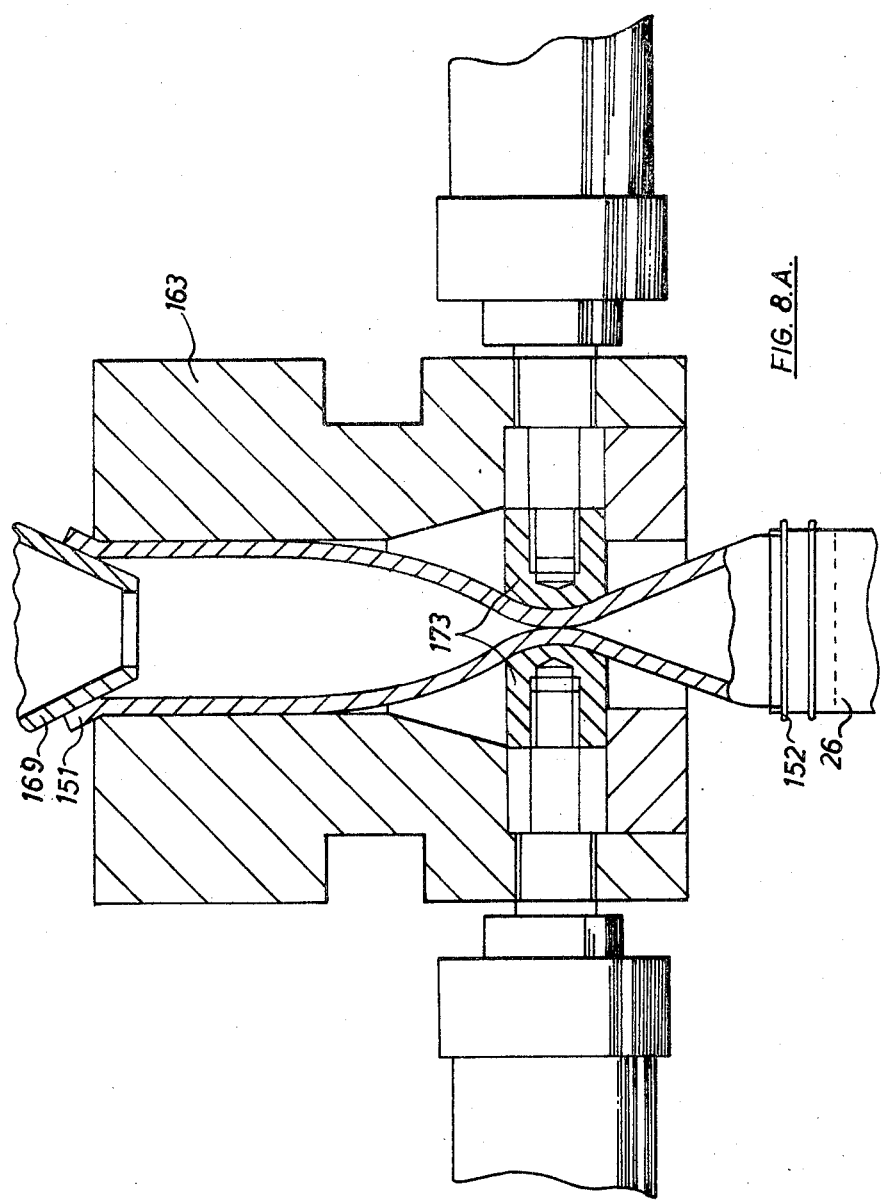

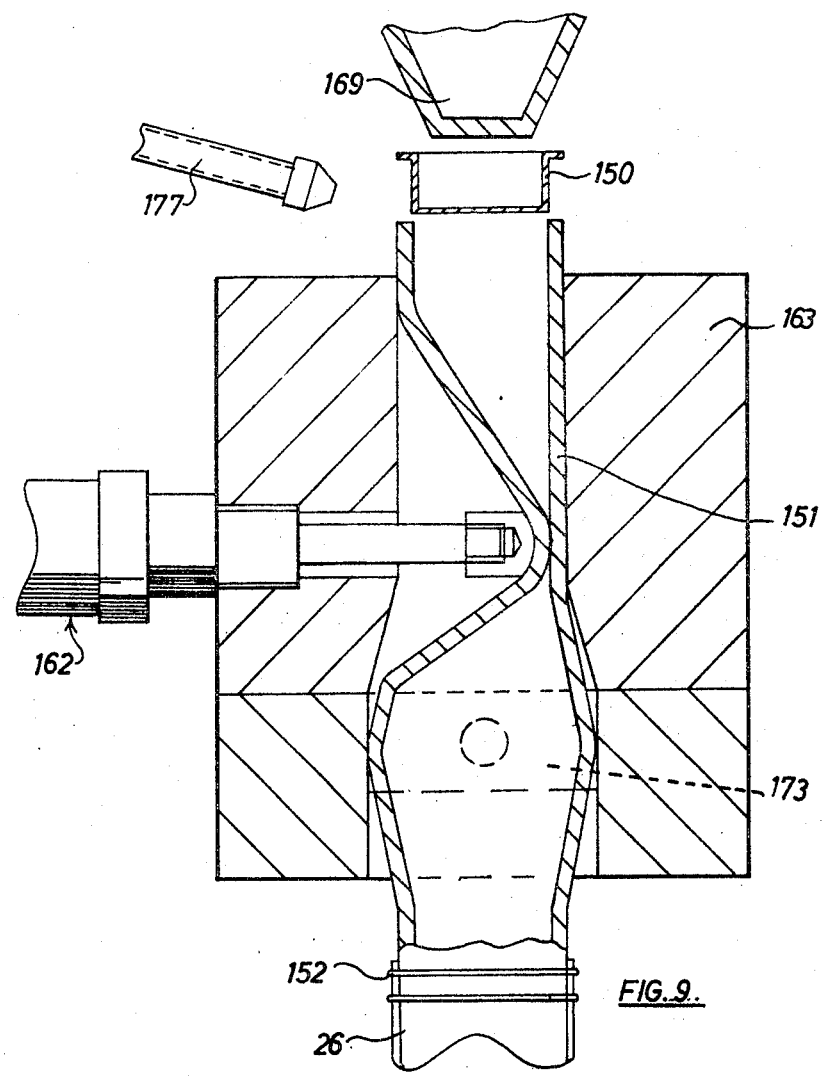

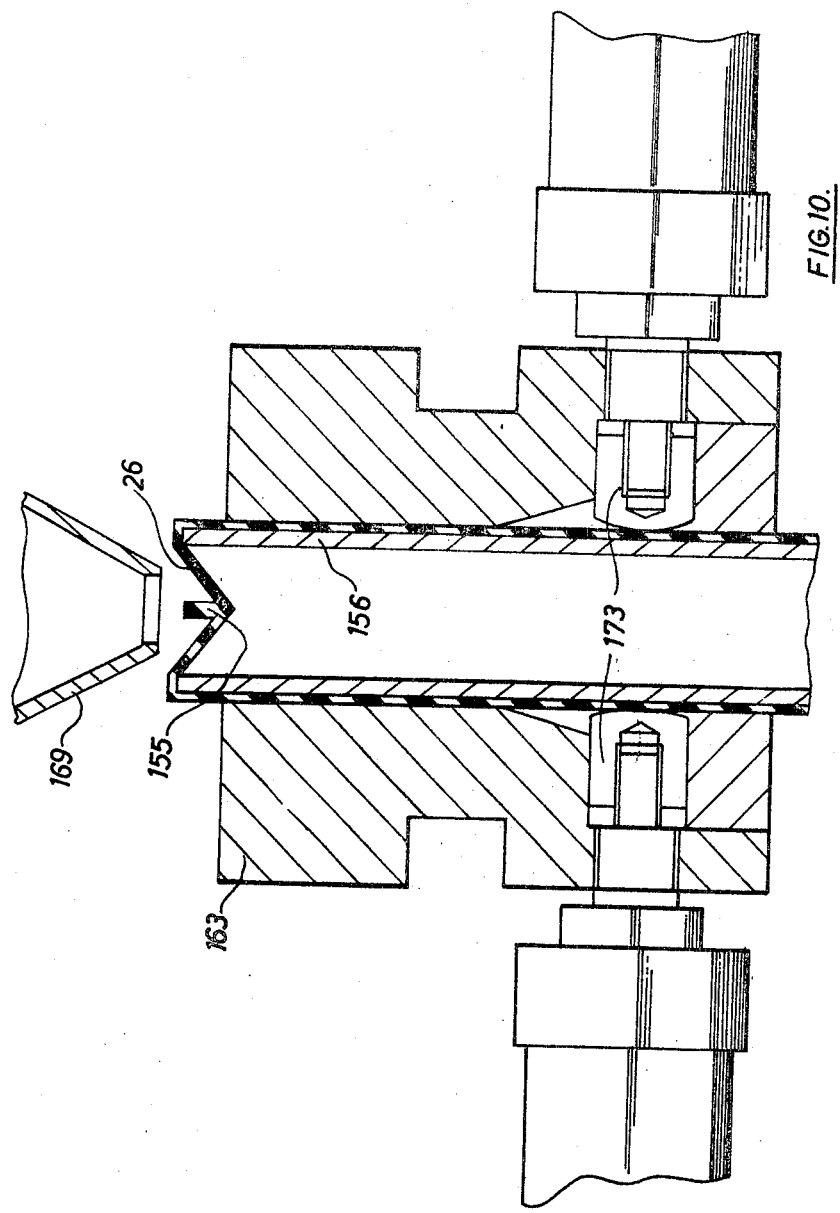

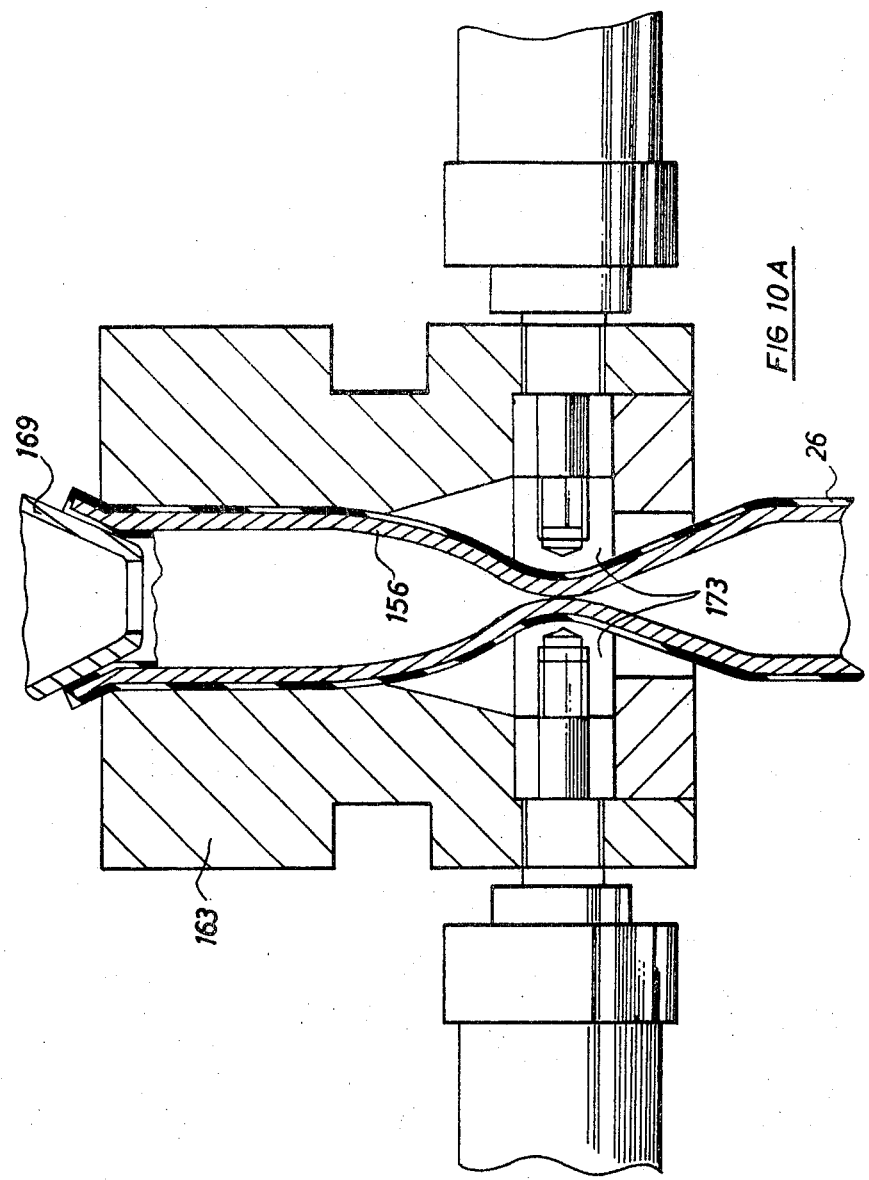

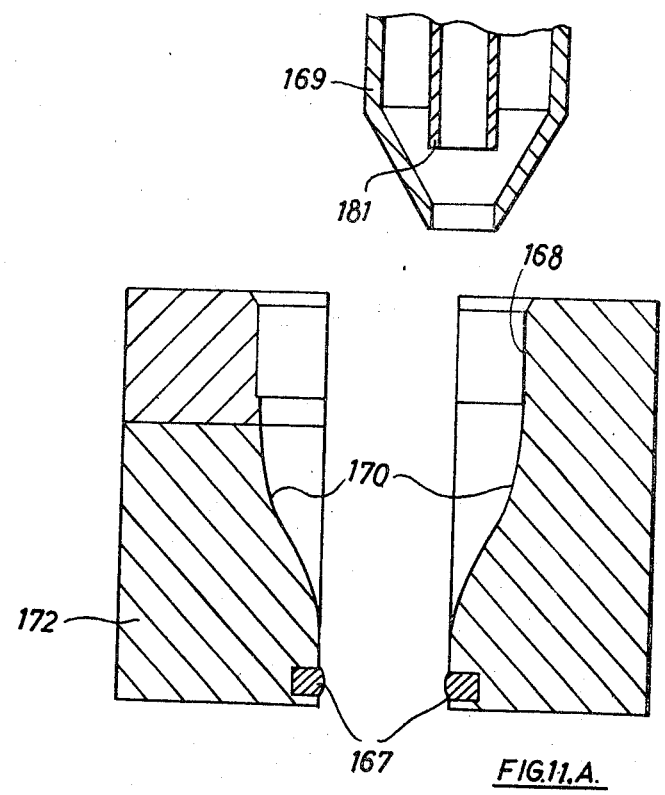
FIG.11.A.

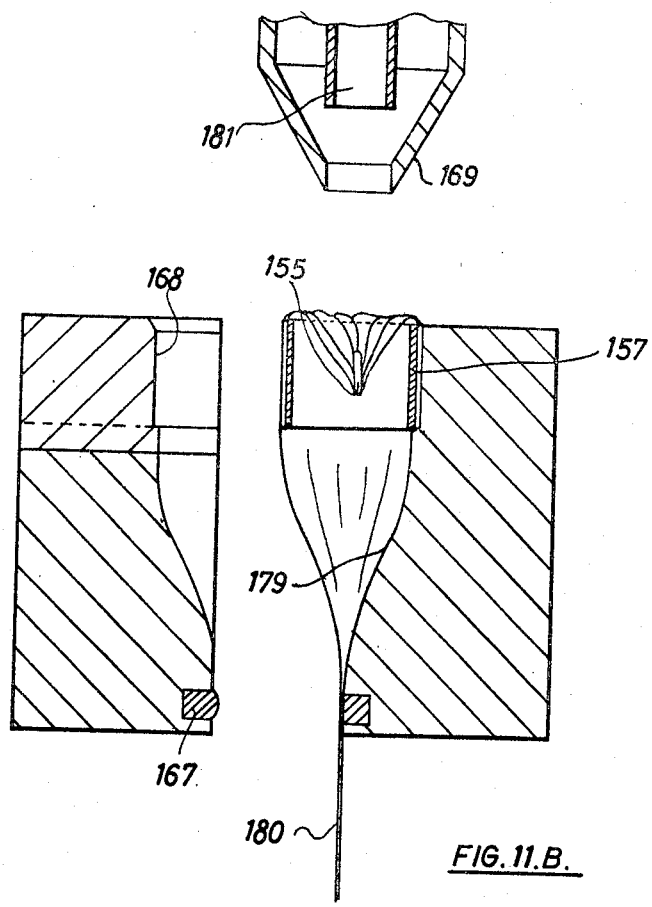
FIG.11.B.

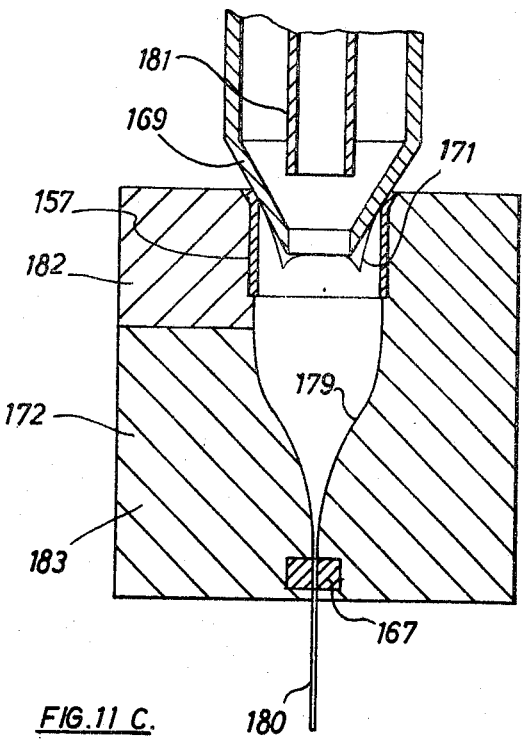

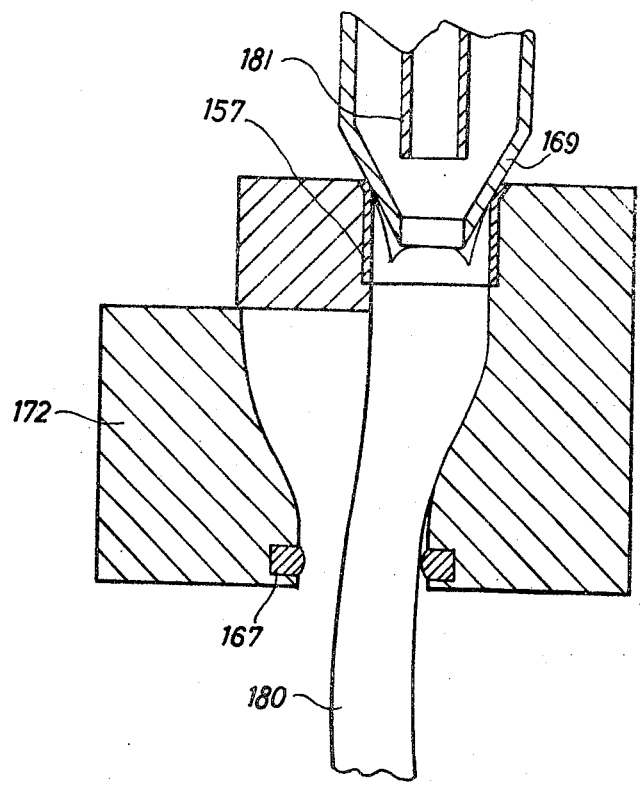
FIG.11.D.

United States Patent Office 3,491,503
Patented Jan. 27, 1970

3,491,503
METHODS AND APPARATUS FOR FILLING PRESTERILIZED CONTAINERS
Thomas Richard Ashton, Bromley, Kent, Victor Claude Herbert Cottle, Finchley, London, David Jackson, Whetstone, London, Michael John Smith, Maidstone, Kent, and William Davidson Weatherup, Langley Heath, Maidstone, England, assignors to Express Dairy Company (London) Limited, London, England, a British company, and Reed Corrugated Cases Limited, London, England, a British company
Filed June 14, 1967, Ser. No. 646,065
Int. Cl. B65b 55/10, 51/30, 43/26
U.S. Cl. 53—3
29 Claims

ABSTRACT OF THE DISCLOSURE

There is disclosed methods of filling presterilized containers aseptically with a sterilized fluid. Each container has a filling pipe which is initially sealed or closed at its outer end with the container in an empty flattened state in which it is sterilized at least internally. The filling pipe is clamped closed near its outer end which is then opened attached to a filling nozzle into which the sterilizing medium is introduced. The temporary clamp is opened and the sterilized fluid filled into the container. Part of the pipe or container includes a portion of heat sealable plastics material which is then heat sealed to seal the container and isolate it from the filling pipe. Several forms of filling pipe are disclosed together with forms of apparatus suitable for use in filling them.

CROSS-REFERENCES TO OTHER APPLICATIONS

The present application relates to developments of the invention which forms the subject of U.S. patent application Ser. No. 640,258, filed May 22, 1967, by Thomas Richard Ashton, Victor Claude Herbert Cottle and David Jackson.

BACKGROUND OF INVENTION

The present invention relates to packaging and is more particularly concerned with packages for containing fluids and methods and apparatus for filling and closing such packages.

It has already been proposed to convey a liquid in the form of sachet or flexible bag of a plastic material to a dispensing machine. This proposal has been applied especially for the transport and dispensing of milk, though it is, of course, applicable to other liquids, whether consumable or otherwise. In one proposal a flexible container or bag of plastic material is provided with a pipe extending from one corner. This pipe is of rubber and is attached to the bag by a surrounding metal binding ring which clamps the bag against the pipe and the pipe against a rigid tubular insert. After filling, the end of the rubber pipe is sealed by a plug. The container or bag is inserted in a dispensing machine with the filling pipe directed downwardly and outwardly and access to the contents is obtained by cutting off the plug. Since the size of the rubber pipe is more appropriate to a relatively long duration discharge of the contents of the bag, considerable time is involved in filling the container through the same pipe. There is now a need for a container to be adapted to receive a charge of sterilized milk; to this end the container and the pipe used for filling or emptying of the container should be brought into and maintained in an aseptic condition before, during and after filling, and during emptying, at least on those surfaces which come into contact with the milk, and this is not readily attainable if a rubber pipe attached to the container is used for filling and if a separate sealing plug must be inserted thereafter in the end of the pipe.

SUMMARY OF INVENTION

According to one feature of the present invention an improved method of filling a fluid into a container through a pipe including at least a portion of flexible material and communicating with the inside thereof and having its outer end initially sealed or closed, which includes at least a portion of heat sealable plastics material wherein the improvement comprises temporarily clamping the pipe to close it at a region between its junction with the container and its outer end, increasing the pressure differential between the outside and the inside of the filling pipe to an extent sufficient to open the outer end of the filling pipe, attaching it to a filling device and applying a sterilizing medium to the inside of the pipe between the filling device and where it is clamped, releasing the temporary clamp, filling the fluid into the container, and heat sealing across the portion of heat sealable plastic material to isolate the inside of the container from the filling device.

The container with its pipe sealed at the outer end is preferably sterilized before the filling operation and the fluid to be filled into it is preferably a sterilized fluid.

The container, provided with a pipe, is preferably in the form of a bag of flexible plastic material, and its pipe is sealed with the bag in an empty, flattened or collapsed state and the whole then sterilized.

The initial sealing of the pipe and the sterilizing of the bag can be done quite independently of the filling and not necessarily at the same time or place and presterilized containers can be filled aseptically by the method or apparatus of the present invention.

The pipe which will hereinafter be referred to as the filling pipe may be entirely of heat sealable plastic material.

After heat sealing the pipe after filling the bag with sterilized fluid, the outer end of the pipe is detached from the filling device and may be left as an extension of the now sealed and shortened pipe, or wholly or partly cut off.

The pressure differential required between the inside and the outside of the filling pipe to break the filling pipe seal can be effected in various ways. One method of producing the required pressure differential is by squeezing the region of the filling pipe above the temporary clamp so increasing the pressure within this filling pipe region by reducing the volume. This method is suitable for a filling pipe which is sealed by means of a plug or a bung, the pressure increase forcing the plug or bung off the filling pipe end allowing the entry into this upper end of the filling pipe of a sterilizing medium. Any sterilizing medium may be used with the above method of effecting the required pressure differential for breaking the filling pipe seal but one other method of producing the pressure differential relies upon the temperature and pressure of the sterilizing medium. This method is suitable for a filling pipe sealed by a heat seal, the sterilizing medium (one suitable medium, for example, is steam) providing both temperature and an increased pressure on the outside of the outer end of the filling pipe on the heat seal so breaking the seal and allowing the sterilizing medium into the outer region of the inside of the filling pipe.

According to another feature of the invention an improved apparatus for filling a container having a pipe including at least a portion of flexible material communicating with the inside thereof which include at least a portion of heat sealable plastics material, wherein the improvement comprises a filling device, selectively operable means at a location spaced from the filling device for temporarily clamping closed a pipe of a container, means for establishing an increased pressure differential between the outside and the inside of the filling pipe to an extent sufficient to open the outer end of the filling pipe, means for clamping the outer end of the pipe to the filling device, valve means for connecting the filling device selectively to a source of sterilizing medium for sterilizing the inside of the filling device and the inside of the part of the pipe and to a source of filling liquid for filling the container, and means for heat sealing the pipe between the container and its outer end.

In one embodiment suitable for use with a plug or cork said pressure increasing means comprises ejector means for squeezing part of the pipe between the clamping means and its outer end.

In another embodiment suitable for use with a heat seal said means for establishing the increased pressure differential comprises a split block, having two halves which together define a cavity which changes its cross-sectional shape from generally flat and rectangular at one end to generally circular at the other and whereby to receive a layflat filling tube having a rigid ring shaped insert at its sealed outer end, the two halves of the block having at their one end sealing means serving as said temporary clamping means and in which one half of the split block comprises an upper part and a lower part movable separately from one another whereby after sterilization the lower part can be moved away from the other half to release the temporary clamping of the filling tube whilst the outer end thereof is retained by the upper part and the other half allows free passage for filling fluid into the container; while the temporary clamp is applied the split block and filling nozzle are moved axially together, the filling nozzle then introducing sterilizing medium at an elevated temperature and pressure into the region of the outer sealed end of the filling pipe; said increase in pressure and the elevated temperature breaking the filling pipe seal and so allowing sterilizing medium to be introduced into the inside region of the filling tube above the temporary clamp; after sterilization the temporary clamp is released and the filling begins.

In both of the above embodiments cutting and heat sealing means are provided for disconnecting the filling pipe from the filling device and sealing the filling pipe and hence sealing the container after filling. Any fluid from the section of filling pipe above the seal after filling may be collected by funnel means; and means of controlling the quantity of fluid to fill the container are also provided.

Means are also provided in both the above embodiments for producing relative axial movement between the filling device and the clamping means for temporarily closing the pipe; the filling device having a tapered filling nozzle which has means provided for introducing selectively either sterilizing medium or filling fluid into the filling pipe.

According to another feature of the present invention, a container with a filling pipe of flexible plastics material with a heat-resistant insert at its outer end and its outer end sealed. The heat resistant insert may be long and suitable for use with a filling tube material which would not withstand the temperature and pressure of a sterilizing medium, for example, for use with a polyethylene filling tube; whereas a short ring-shaped insert may be used with a substantially stronger material; for example, nylon may be used, it being capable of withstanding the various extreme conditions which may be imposed upon it.

After forming the bag with the filling pipe heat sealed to the bag or otherwise attached to and interconnected with the bag, and with the emptying pipe, if provided, heat sealed or otherwise attached thereto, the outer end of the filling pipe is closed, and the emptying pipe, if provided, is plugged or sealed, whilst the container or bag is still empty. The inside of the bag and the outside of the bag and the inside of the outer wrapper, as well as the inside of the filling pipe, and the inside of the emptying pipe, if provided may then be rendered aseptic in a suitable manner, such as by subjecting them to a-, b-, Y-, X-, or possibly ultra-violet radiation.

The inner container can now be filled as described with sterilized liquid in such a manner that the container, when filled and sealed, may at least so far as its inside surfaces are concerned, still be in an aseptic condition.

The tubular element of heat sealable material may itself be part of the container, especially if the container is wholly or partly of heat sealable material and thus integral therewith, or may be attached and sealed to the container to form an extension therefrom.

If the container, at least in that part thereof which is attached to the filling pipe, is of heat sealable material, the filled container can be sealed by means of a heat seal in the region of the attachment of the filling pipe. Such heat seal can be effected in the body of the container itself or can be effected in an extension of the body of container and to which the filling pipe is attached, but in any case such heat serves two purposes, first to seal the filled container and second to isolate the filling pipe from the container.

The invention will be further described by way of example with reference to the accompanying drawings in which:

FIG. 5 (FIG. 5A and FIG. 5B) is a preferred embodiment of the apparatus for filling a container with predetermined volume of fluid utilizing the filling pipe illustrated in FIG. 5.

FIG. 6 is a diagrammatic representation of the preferred embodiment shown in FIG. 10.

FIG. 7 is a diagram of the hydraulic and electrical system for controlling the preferred embodiment illustrated in FIGS. 10 and 11.

FIG. 8 is a detailed cross-sectional view of the block assembly, including the clamping jaws and ejector mechanism, of the preferred embodiment illustrated in FIGS. 5 and 6 with a filling tube according to FIG. 2 in the initial position.

FIG. 8A is a detailed cross-sectional view of the block assembly, including the clamping jaws and ejector mechanism, of the preferred embodiment illustrated in FIGS. 5 and 6 with a filling tube according to FIG. 2 in a position where it is clamped, the ejector has removed the plug and as illustrated the filling nozzle is adjacent to the filling tube opening.

FIG. 9 is a detailed cross-sectional view of the block assembly at 90°, rotated on the filling nozzle axis, to FIGS. 8 and 8A illustrating the ejector mechanism in an operated position so removing the plug from the filler tube.

FIG. 10 is a detailed cross-sectional view of a clamping block with a filling tube according to FIG. 3 just in the initial position prior to clamping.

FIG. 10A is a detailed cross-sectional view of a clamping block with a filling tube according to FIG. 3, with the tapered filling nozzle adjacent to the filling tube opening.

FIG. 11A is a cross-section of a split block clamping arrangement for use with the filling tube embodiment shown in FIG. 8.

FIG. 11B is a cross-section of a split block as in FIG. 16A including the layflat tube with its semi-rigid tubeless insert positioned freely between the halves of the split block.

FIG. 11C is a cross-sectional view of the split block halves clamped together with the layflat tube clamped between the halves of the split block prior to sterilization.

FIG. 11D is a cross-sectional view of the unclamped split block, with the insert of the layflat tube still clamped, but the layflat tube itself opened for through passage for a filling fluid.

Figure 1:
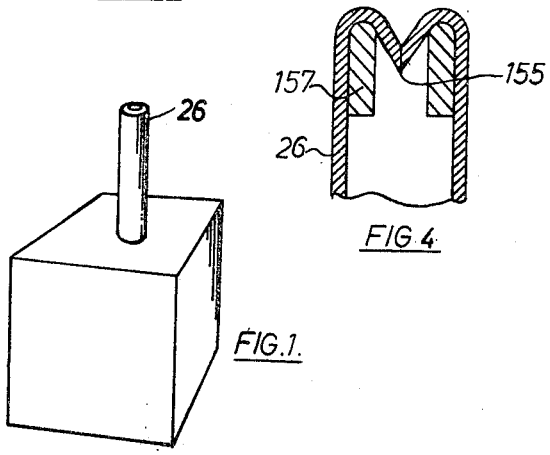
FIG. 1 is a diagrammatic perspective view of one suitable form of container for filling with sterilized fluid.

One suitable form of container for filling aseptically with a sterilized liquid is illustrated diagrammatically in perspective in FIG. 1 and comprises a substantially box like shaped configuration manufactured from a flexible plastics material which may or may not be heat sealable. Such suitable heat sealable plastics materials are, for example, polyethylene and polypropylene and also nylon can be used. The filling pipe 26 can be made of the same material as the bulk of the container or may be of say, for example, nylon whilst the bulk of the container may be of, for example, polyethylene or polypropylene; the nylon filling tube being resistant to the sterilizing medium's temperature.

Figure 2:
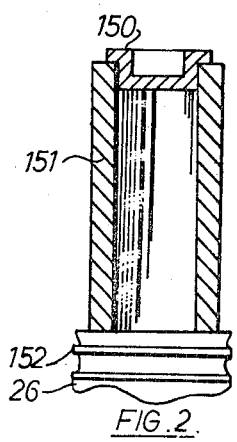
FIG. 2 is a cross-section of an embodiment of a filling tube for a container, a semi-rigid tubular insert being attached by a wire tie to the filling tube and sealed by a plug or cork.
Figure 3:
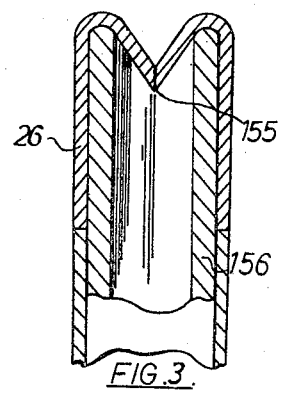
FIG. 3 is a cross-section of a further embodiment of a filling tube for a container, the semi-rigid tubular insert being sealed within the filling tube and the heat sealed end of the tube folded over into the end of the insert.
Figure 4:
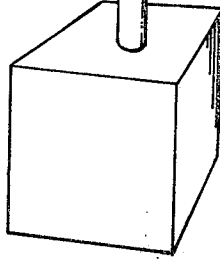
FIG. 4 is a modified embodiment of FIG. 3, the semi-rigid tubular insert being short in the form of a ring.

The filling pipe can be of many convenient configurations, three such embodiments being illustrated in FIGS. 2 to 4. In FIG. 2 the semi-rigid tubular insert 151 is attached to the filling tube 26 by means of a wire tie 152; the end being sealed by a plug or cork 150. A preferred embodiment of the filling pipe is illustrated in FIG. 3 of the drawings, the semi-rigid tubular insert 156 being completely enclosed within the filling tube 26, the open end of the filling tube being sealed by folding the tube into the semi-rigid tubular insert 156 and then heat sealing the tube 26 as at 155. FIG. 4 illustrates the use of a shortened version of the semi-rigid tubular insert 157, the insert being even in the form of a rigid ring, which just opens the layflat tube 26 to allow a filling nozzle to be inserted.

In FIG. 5 a preferred embodiment of the apparatus to be used with the filling pipe of FIG. 2 is illustrated; a diagrammatic representation of the apparatus being illustrated in FIG. 6. The block 163 incorporates an ejector cylinder 162 and a clamp 173; the assembly of the block, clamp and ejector cylinder being axially movable relative to the filling nozzle 169 by means of a toggle clamp 164 which is fluid operated. Vertically below the block 163 there are heat seal jaws 174 and heated cutters 175 which heat seal and cut the filling pipe after filling, so sealing the container and leaving the top of the filling pipe and the semi-rigid wire tied tubular insert to be discarded or utilized on another container. A funnel 178 is situated below the cutters 175 and heat seals 174 to collect fluid after the filling pipe is cut. The container rests on a weight scale 176 which controls the volume of fluid to fill the container.

In the primary operation of the apparatus, FIGS. 6 and 7 must be considered together, the semi-rigid insert 151 (FIG. 8) is clamped to close it in the clamping jaws 173, the ejector 162 then compresses the end portion of the filling tube beyond the clamping jaws 173 so forcing the sealing cap 150 off, the cap then being removed by an air jet 177. The ejector 162 then returns to its original position and the toggle clamp moves the whole block assembly 163 axially with respect to the filling nozzle 169 so that the filling tube 151 connects with the tapered filling nozzle 167 in FIG. 6 (169 in other figures) whereupon the sterilization of the inside of the filling tube down to the clamped region can commence. After sterilization the clamp 173 is released so that the filling tube 26 is open but firmly gripped between the nozzle 167 in FIG. 6 and the block 163, the filling of the container then beginning. The detailed procedure for the operation just described is completed by a set of valves, a control system for which is illustrated diagrammatically by way of example in FIGS. 6 and 7.

A suitable sequence of operations controlled by the sequence controller is as follows with the corresponding solenoid positions, where D/A indicates a double acting cylinder and S/A indicates a single acting cylinder; the solenoid reference "+" indicating that a solenoid is in an energized state and the solenoid reference "−" indicating that a solenoid is in a deenergized state:

| Insert the Rubber Filling Tube | Cylinder Action | Solenoid Ref. |
| --- | --- | --- |
| (1) Close clamping jaws, 173 | D/A | A+ |
| (2) Extend ejector cylinder, 162 | D/A | B+ |
| (3) Switch on air jet, 177 | S/A | J+ |
| (4) Retract ejector cylinder, 162 | D/A | B− |
| (5) Switch off air jet, 177 | S/A | J− |
| (6) Raise toggle clamp, 164 | D/A | C+ |
| (7) Open steam valve | S/A | E+ |
| (8) Close steam valve | S/A | E− |
| (9) Open exhaust valve | S/A | F+ |
| (10) Close exhaust valve | S/A | F− |
| (11) Open clamping jaws, 173 | D/A | A− |
| (12) Open milk valve | S/A | G+ |
| (13) Close milk valve | S/A | G− |
| (14) Close clamping jaws, 173 | D/A | A+ |
| (15) Open water valve | S/A | H+ |
| (16) Open exhaust valve | S/A | F+ |
| (17) Extend heat seal cylinder, 174 | D/A | D+ |
| (18) Extend cutter bar cylinder, 175 | S/A | K+ |
| (19) Retract cutter bar cylinder, 175 | S/A | K− |
| (20) Retract heat seal cylinder, 174 | D/A | D− |
| (21) Close water valve | S/A | H− |
| (22) Close exhaust valve | S/A | F− |
| (23) Extend funnel (manual), 178 | | |
| (24) Open clamping jaws, 173 | D/A | A− |
| (25) Retract funnel (manual), 178 | | |
| (26) Lower toggle clamps, 164 | D/A | C− |

A suitable fluid for driving the piston and cylinder mechanism is compressed air.

A detailed view in cross-section of the clamping block, filling pipe and filling nozzle according to the above preferred embodiment of FIG. 5 is illustrated in FIG. 8. The ejector mechanism is also shown in detail in FIG. 9 where it is in its operating position equivalent to the above listed position 3, forcing the plug 150 off the pipe 151, the plug 150 being forced away from the nozzle 169 by the air jet 177.

The filling pipe as illustrated in FIG. 3 of the drawings is preferably used in conjunction with a clamping block 163 a cross-section of which is illustrated in FIG. 10. In this embodiment the semi-rigid tubular insert 156 is completely inside the filling tube 26 of heat sealable material, the filling tube being heat sealed as at 155 and tucked into the insert 156. No ejector mechanism is required as the block 163 is moved axially towards the filling nozzle 169 where the tapered edges of the filling nozzle press the insert and pipe against the block 163, as in FIG. 10A; the clamping jaws 173 can then clamp on the insert 156 to close it. A sterilizing medium, such as steam, is then introduced via the filling nozzle 169 into the filling tube. The combined effect of the temperature and pressure of the sterilizing medium breaks the heat seal 155 in the heat sealable material 26 of the filling pipe so giving access to the filling pipe as far as the clamped region, for the sterilizing medium. The semi-rigid tubular insert is of a material capable of withstanding (without damage) the temperature and pressure of the sterilizing medium and also protecting the outer filling tube from the sterilizing conditions, the clamping block 163 acting as a heat sink to keep the heat sealable material 26 cool.

The filling tube 26 of heat sealable material with the semi-rigid tubular insert 157 illustrated in FIG. 4 is preferably used in conjunction with a shaped split block 172 as illustrated in FIGS. 11A–11D. No clamping jaws are required as the seals 167 form the temporary clamp when the sides of the split block 172 come together. The small ring-shaped rigid tubular insert 157 converts a layflat tube 180 into the required cylindrical tube 179. The top portion of the split block is shaped to the form 168 of the rigid tubular insert, so that it can grip firmly the insert 157. The filling nozzle 169 and the split block 172 move axially together so gripping the tube 179 and the insert 157 between the filling nozzle 169 and the block 172. A sterilizing medium is then introduced down the interior of the filling nozzle 181 breaking the heat seal 155 and sterilizing the tube volume within the split block, the shaped side 179 taking the pressure of the sterilizing medium and the block 172 acting as a heat sink. The portion 182 of the block 172 remains gripping the rigid insert and the lower portion 183 is removed so releasing the seals 167 and allowing the container to be filled via tube 180 with an entry section of the tube 179 sterilized by the foregoing operations.

The filling pipe 26 can be made of many flexible plastics materials, for example, polythene, polyethylene and polypropylene are suitable for the embodiments of the filling pipe as illustrated in FIGS. 2, 3 and 4 and also FIG. 1 of the drawings. The aforementioned materials are suitable for use with the semi-rigid tubular inserts illustrated in FIGS. 2 and 3, the inserts withstanding the temperature and pressure of the sterilizing medium, after clamping to close the filling pipe. In the case of the filling pipe embodiment illustrated in FIG. 4 for use with the split block, the insert is ring-shaped and only serves to convert the layflat tube to a tubular shape and not to protect the actual filling tube during sterilization. For this reason, in this arrangement the filling tube should be of a material which will withstand the temperature and pressure of the sterilizing medium, and, by way of example, one suitable such material is nylon.

We claim:

1. An improved method of filling a fluid into a container through a pipe including at least a portion of flexible material and communicating with the inside thereof and having its outer end initially sealed or closed which includes at least a portion of heat sealable plastics material, wherein the improvement comprises temporarily clamping the pipe to close it at a region between its junction with the container and its sealed outer end, increasing the pressure differential between the outside and the inside of the filling pipe to an extent sufficient to open the outer end of the filling pipe, attaching the pipe to a filling device and applying a sterilizing medium to the inside of the pipe between the filling device and where it is clamped, releasing the temporary clamp, filling the fluid into the container and heat sealing across the portion of heat sealable plastic material to isolate the inside of the container from the filling device.

2. A method according to claim 1, in which the pressure differential is increased by reducing the volume of the interior of the filling pipe between its outer end and the region where it is clamped closed.

3. A method according to claim 2, in which the reduction of volume is effected by compressing the walls of the filling pipe between its outer end and the region where it is clamped closed.

4. A method according to claim 2 in which the reduction of volume is effected by applying a sterilizing medium at elevated temperature and pressure to the outside of the sealed outer end of the filling pipe.

5. A method according to claim 1, in which the pressure differential is increased by increasing the pressure within the filling pipe between the outer end and the region where it is clamped closed.

6. A method according to claim 1, in which the pressure differential is increased by increasing the pressure outside the sealed outer end of the filling pipe between its outer end and the region where it is clamped closed.

7. The method defined in claim 5 wherein the filling pipe is closed with a plug and wherein the step of increasing the pressure differential between the outside and the inside of the filling pipe forces the plug from the filling pipe thereby allowing the filling device to connect with the open end of the filling pipe.

8. The method defined in claim 6 further including the step of, after the temporary clamp has been applied, moving a filling nozzle associated with the filling device and the outer sealed end of the filling pipe relatively and axially towards each other until the filling nozzle is in contact with the outer sealed end of the filling pipe, and wherein said pressure differentital is obtained by introducing the sterilizing medium down the filling nozzle such that the temperature and pressure of the sterilizing medium breaks the seal at the outer end of the filling pipe to allow the sterilization of the region inside the filling pipe between its outer end and the temporary clamp.

9. An improved apparatus for filling a container having a pipe including at least a portion of flexible material communicating with the inside thereof which includes at least a portion of heat sealable plastics material, wherein the improvement comprises a filling device, selectively operable means at a location spaced from the filling device for temporarily clamping closed a pipe of a container, means for establishing an increased pressure differential between the outside and the inside of the filling pipe to an extent sufficient to open the other end of the filling pipe, means for clamping the outer end of the pipe to the filling device, valve means for connecting the filling device selectively to a source of sterilizing medium for sterilizing the inside of the filling device and the inside of the part of the pipe and to a source of filling liquid for filling the container, and means for heat sealing the pipe between the container and its outer end.

10. An apparatus according to claim 9 in which said pressure increasing means comprises ejector means for squeezing part of the pipe between the clamping means and its outer end.

11. An apparatus according to claim 9, in which the said means for establishing the increased pressure differential comprises a split block, having two halves which together define a cavity which changes its cross-sectional shape from generally flat and rectangular at one end to generally circular at the other and whereby to receive a layflat filling tube having a rigid ring shaped insert at its sealed outer end, the two halves of the block having at their one end sealing means serving as said temporary clamping means and in which one half of the split block comprises an upper part and a lower part movable separately from one another whereby after sterilization the lower part can be moved away from the other half to release the temporary clamping of the filling tube whilst the outer end thereof is retained by the upper part and the other half allows free passage for filling fluid into the container.

12. An apparatus according to claim 10 further including means for establishing relative axial movement between the filling nozzle and the clamping means for temporarily closing the pipe.

13. An apparatus according to claim 2 in which the means for establishing relative axial movement between the filling nozzle and the temporary clamping means is a toggle clamp.

14. An apparatus according to claim 10 in which the filling nozzle is tapered.

15. An apparatus according to claim 10 in which cutter means are provided for cutting the filling pipe on or above the heat seal.

16. An apparatus according to claim 10 in which a funnel is provided to collect the wasted fluid from the upper region of the filling pipe, that is the region of the filling pipe above the heat seal, after cutting.

17. An apparatus according to claim 10 in which means for controlling the quantity of fluid required to fill the container are provided.

18. An apparatus according to claim 15 wherein a weight scale is used to control the quantity of fluid required to fill the container.

19. An apparatus according to claim 10 wherein the filling nozzle comprises two substantially concentric pipes together with means for selectively connecting the one of said pipes to a source of sterilizing medium and the other of said pipes to a source of filling fluid.

20. An apparatus according to claim 10 including program control means for actuating said clamping means, controlling the supply of sterilizing medium and of sterilized fluid and operation of said heat sealing means on a predetermined program.

21. An apparatus according to claim 11 further including means for establishing relative axial movement between the filling nozzle and clamping means for temporarily closing the pipe.

22. An apparatus according to claim 21 in which the means for establishing relative axial movement between the filling nozzle and the temporary clamping means is a toggle clamp.

23. Apparatus according to claim 11 wherein said filling device has an associated filling nozzle, said filling nozzle being tapered.

24. An apparatus according to claim 11 in which cutter means are provided for cutting the filling pipe on or above the heat seal.

25. Apparatus according to claim 11 further including a funnel for collecting wasted fluid from the upper region of the filling pipe above the heat seal after cutting of the pipe.

26. An apparatus according to claim 11 further including means for controlling the quantity of fluid required to fill the container.

27. Apparatus according to claim 11 further including means including a weight scale for controlling the quantity of fluid required to fill the container.

28. Apparatus according to claim 11 wherein said filling device includes a filling nozzle, said filling nozzle comprising two substantially concentric pipes and means for selectively connecting one of said pipes to a source of sterilizing medium and the other of said pipes to a source of filling fluid.

29. An apparatus according to claim 11 including program control means for actuating said clamping means, controlling the supply of sterilizing medium and of sterilized fluid and operation of said heat sealing means on a predetermined program.

References Cited

UNITED STATES PATENTS

| | | | |
|---|---|---|---|
| 2,787,875 | 4/1957 | Johnson | 53—266 |
| 2,930,170 | 3/1960 | Holsman et al. | 53—37 |
| 3,340,671 | 9/1967 | Loo | 53—39 X |

TRAVIS S. McGEHEE, Primary Examiner

R. L. SPRUILL, Assistant Examiner

U.S. Cl. X.R.

53—37, 167, 266, 381; 141—1, 83